Oct. 17, 1967  J. W. GIFFEN  3,347,652
APPARATUS FOR FORMING ARTICLES FROM OVERLAPPING GLASS SHEETS
Filed May 11, 1964  8 Sheets-Sheet 1

INVENTOR.
James W. Giffen
BY
ATTORNEY

INVENTOR.
James W. Giffen

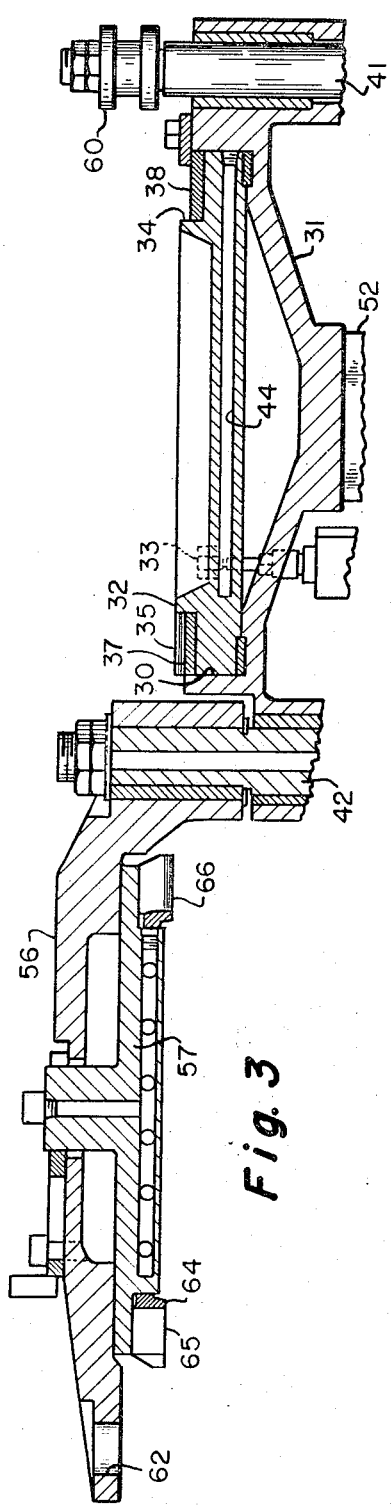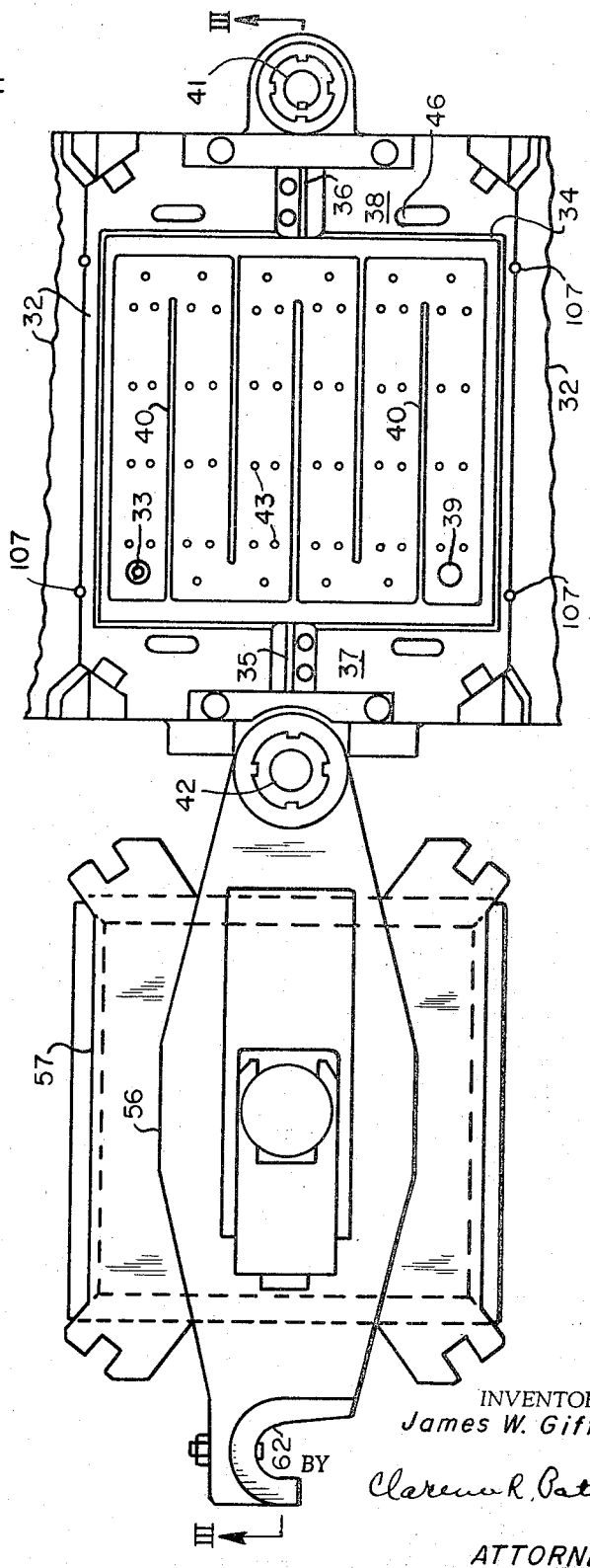

INVENTOR.
James W. Giffen

BY Clarence R. Petty, Jr.

ATTORNEY

Oct. 17, 1967  J. W. GIFFEN  3,347,652
APPARATUS FOR FORMING ARTICLES FROM OVERLAPPING GLASS SHEETS
Filed May 11, 1964  8 Sheets-Sheet 5

INVENTOR.
James W. Giffen
BY
Clarence R. Patty Jr.
ATTORNEY

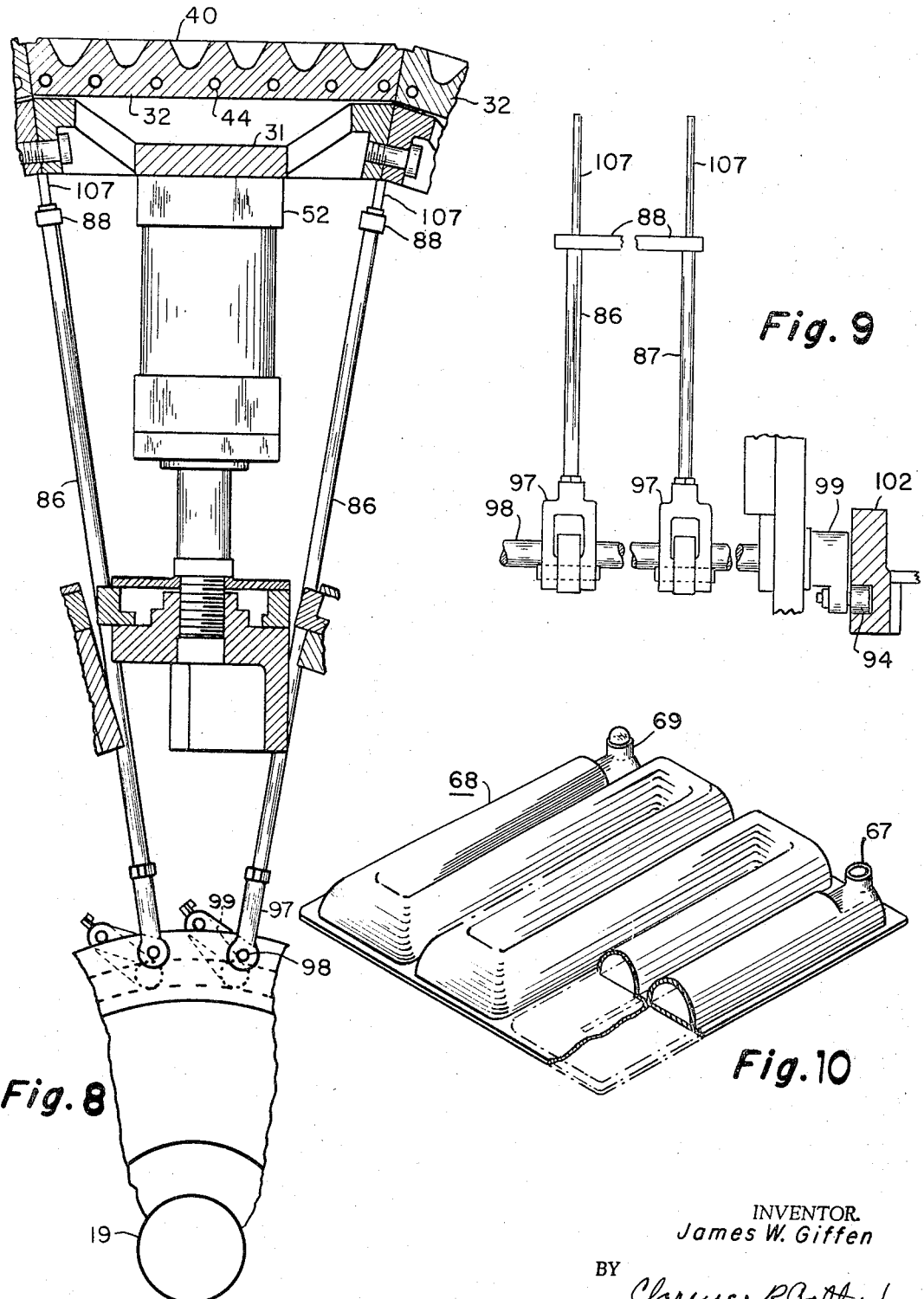

INVENTOR.
James W. Giffen

ATTORNEY

United States Patent Office 3,347,652
Patented Oct. 17, 1967

3,347,652
APPARATUS FOR FORMING ARTICLES FROM OVERLAPPING GLASS SHEETS
James W. Giffen, Corning, N.Y., assignor to Corning Glass Works, Corning, N.Y., a corporation of New York
Filed May 11, 1964, Ser. No. 366,474
7 Claims. (Cl. 65—152)

The present invention relates to apparatus for the successive formation of articles in continuously moving molds which are preferably arranged about the periphery of a continuously rotating turret. The molds of such turret are successively supplied with ribbons of molten material, such as glass, which are trained or laid thereover, and the articles are formed during the continuous travel of the ribbons towards a cullet discharge position.

In brief, articles are vacuum formed in molds carried by a turret in the following manner: As the turret moves through an arc, a section of a ribbon of molten glass, or the like, is deposited over the top opening of the bottom section of a mold, having a complementary oppositely faced and laterally disposed upper section. A vacuum is applied to such bottom section to conform the overlay of glass to the interior contour of such bottom section.

As the foregoing operation is taking place, a section of a second ribbon of glass is laid over that ribbon first deposited on the bottom section, and the top mold section is immediately thereafter swung into axial alignment with its lower section. As such alignment is effected the upper mold section is lowered into cooperative relation with its lower mold section, and in doing so trims excess glass of the ribbons from around the mold wall bordering its cavity, and shears or chops the ribbons transversely laterally of the mold sections. Also as the closure of the mold is effected, a vacuum is created within the cavity of the upper section to impart the cavity contour of such upper mold section to the last deposited ribbon section, thus completing an article within the mold.

Following completion of an article, vacuum is retained in the upper mold section so that it serves as a vacuum chuck to retain the article therein while the upper mold section is raised clear of the lower mold section. Thereafter, the upper mold section is enabled to carry the finished article to an initial position laterally of the turret. Vacuum is also applied laterally of the cavity of the lower mold section to retain the cullet ribbon thereon, until it is subsequently released therefrom.

After a predetermined further arcuate movement of the turret, a vacuum take-out device, supported on an arm pivoted about the turret axis, and while traveling with the turret, seizes the article, withdraws it from its upper mold section, moves it from under such mold section, and releases it upon a suitable support. Immediately thereafter the arm returns the take-out device to its initial position in readiness to repeat the operation as subsequently formed articles become available in successively presented molds.

The foregoing operations involving negative pressure are effected in the exact required sequence and timed relation through the medium of Venturies which are activated by fluid fed through passages in the turret shaft and its surrounding hub. Similarly, fluid units that effect movements of the mold sections are fed fluid by a distributing valve surrounding the turret shaft, through which fluid is supplied and returned from such units in the exact sequence and timed relation desired. Thus, all fluids required for performing the respective article forming operations are effected without the need of auxiliary control equipment.

As a mold is rotated by the turret approximately 160° from the position in which it receives glass, application of vacuum to the cullet ribbon surrounding the lower mold wall section is discontinued, and cam-actuated fingers engage and remove the cullet from about the adjacent halves of two adjoining lower mold sections. Conveniently, removal of an article from its upper mold section is effected at approximately the same time.

For a more concise description of the invention, reference is made to the accompanying drawings wherein:

FIGURE 3 is an enlarged sectional view of a fragment of the machine taken along line III—III of FIGURE 4.

FIGURE 4 is an enlarged plan view of a fragment of the machine.

Figure 7:
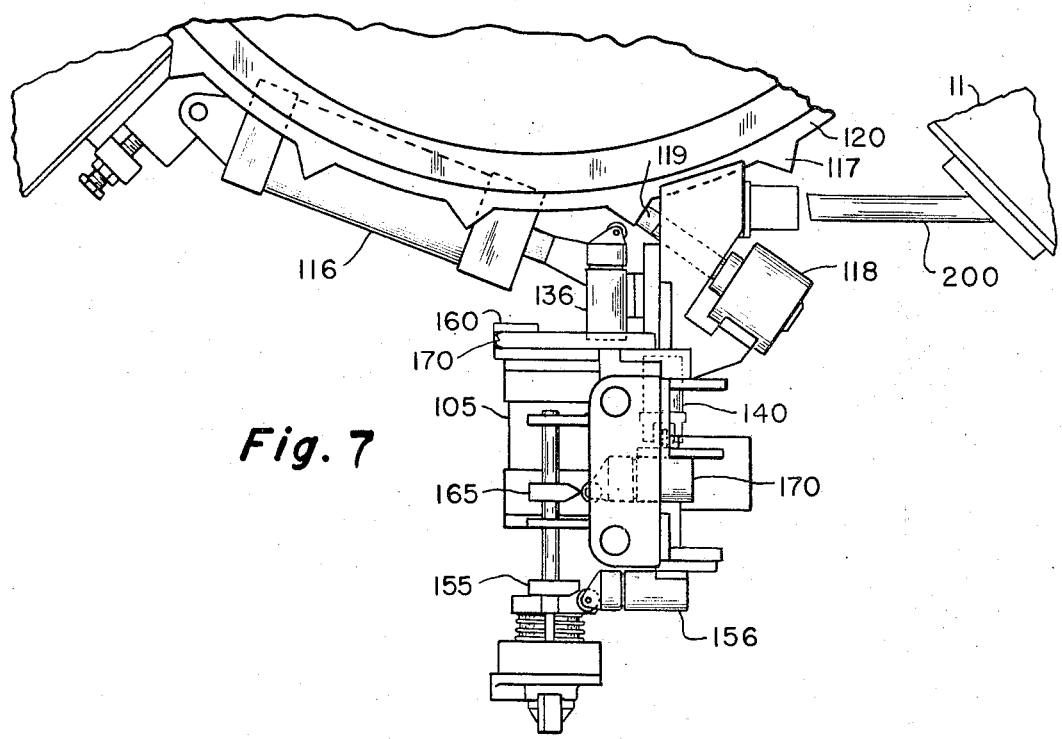

FIGURES 7, 8, and 9 are enlarged views of fragments of the machine.

FIGURE 10 is a view, partly in section, of an envelope formed in the machine.

Figure 11:
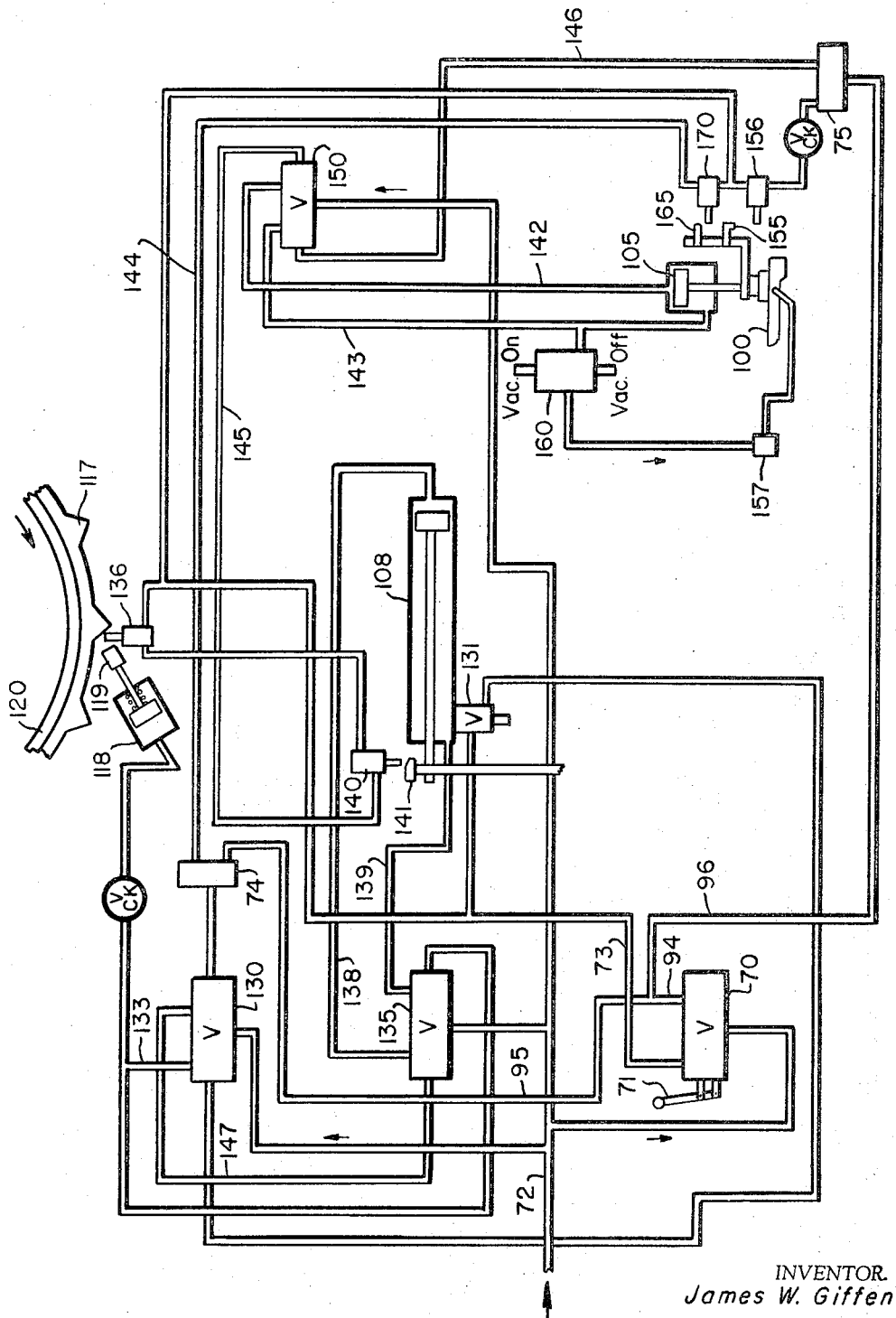

FIGURE 11 is a piping diagram of the portion forming the machine.

Figure 12:
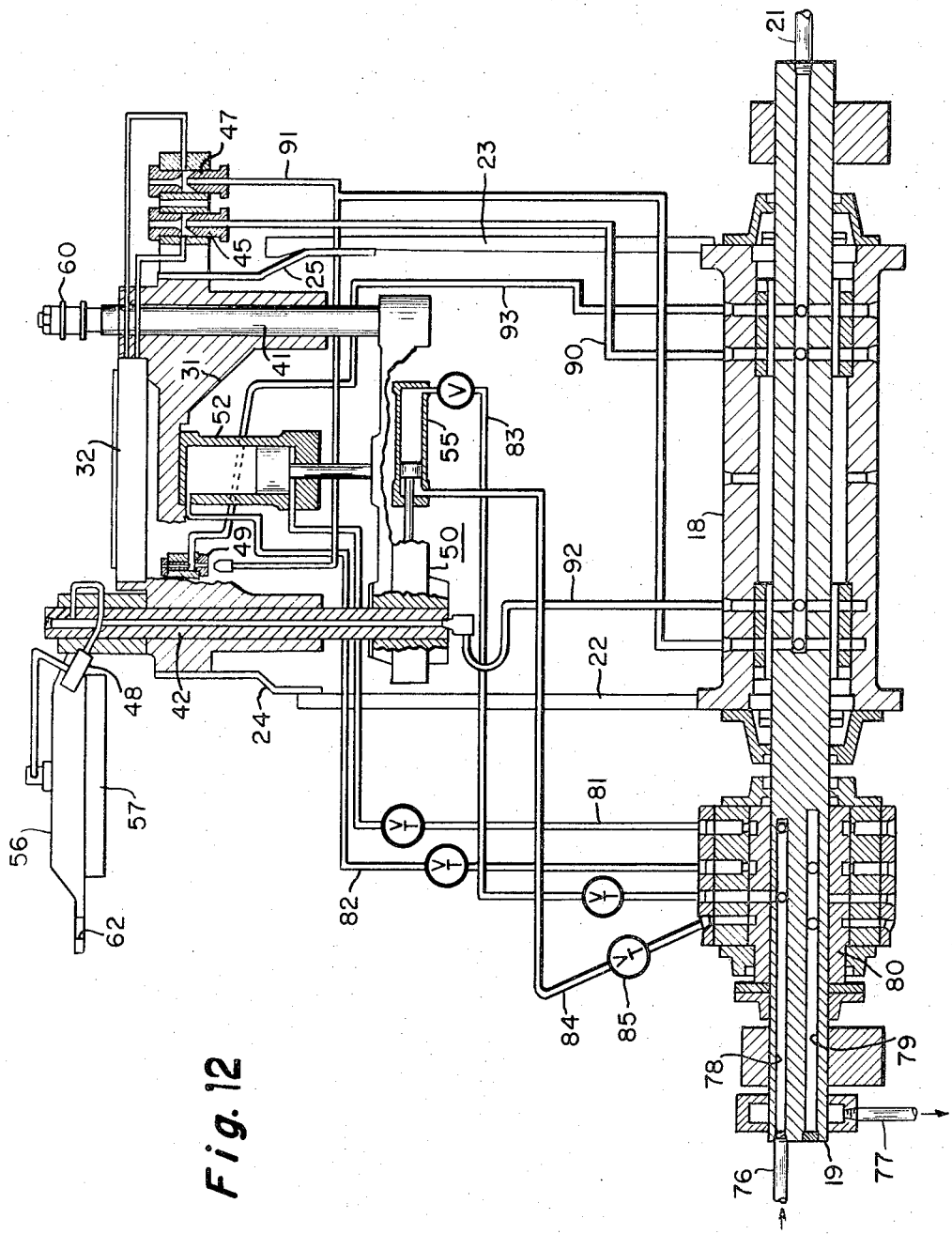

FIGURE 12 is a piping diagram of the take-out portion of the machine.

Figure 1:
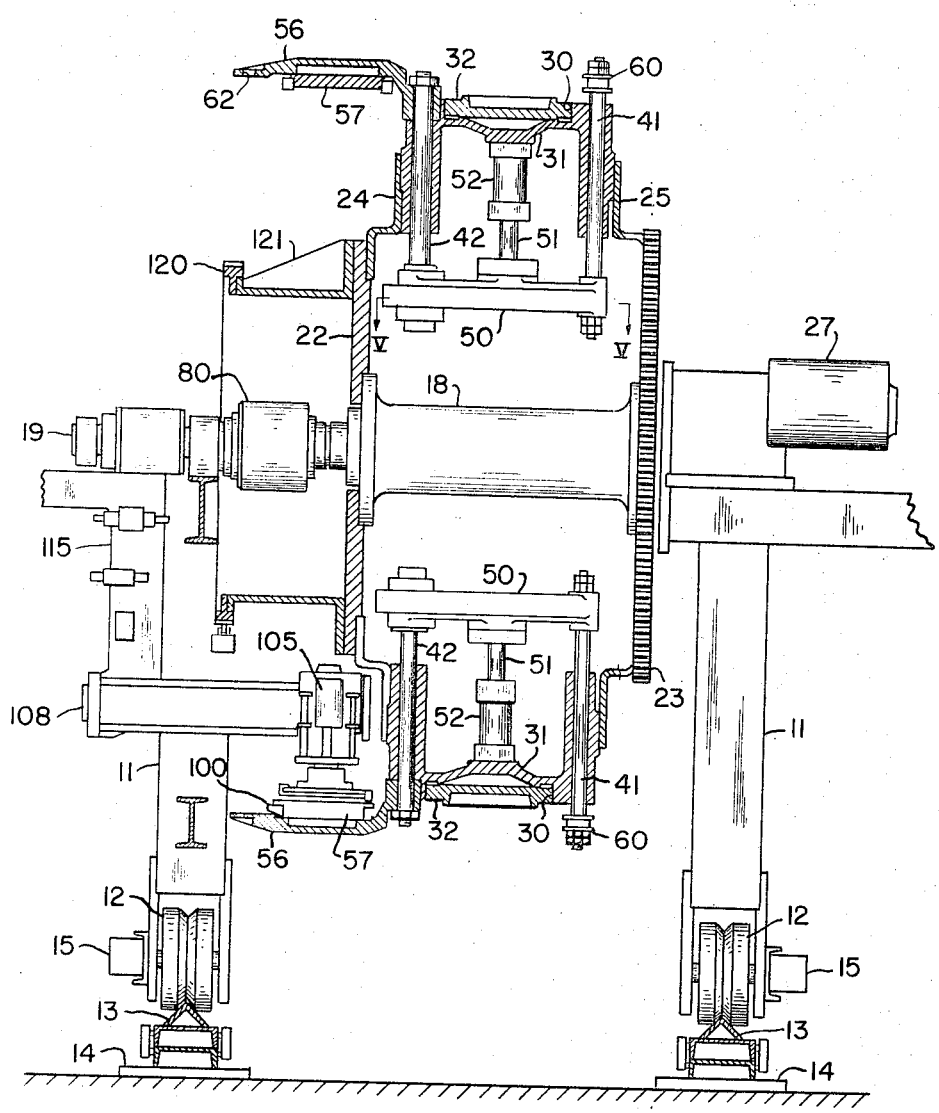
FIGURE 1 is a sectional end elevation of a machine embodying the invention.
Figure 2:
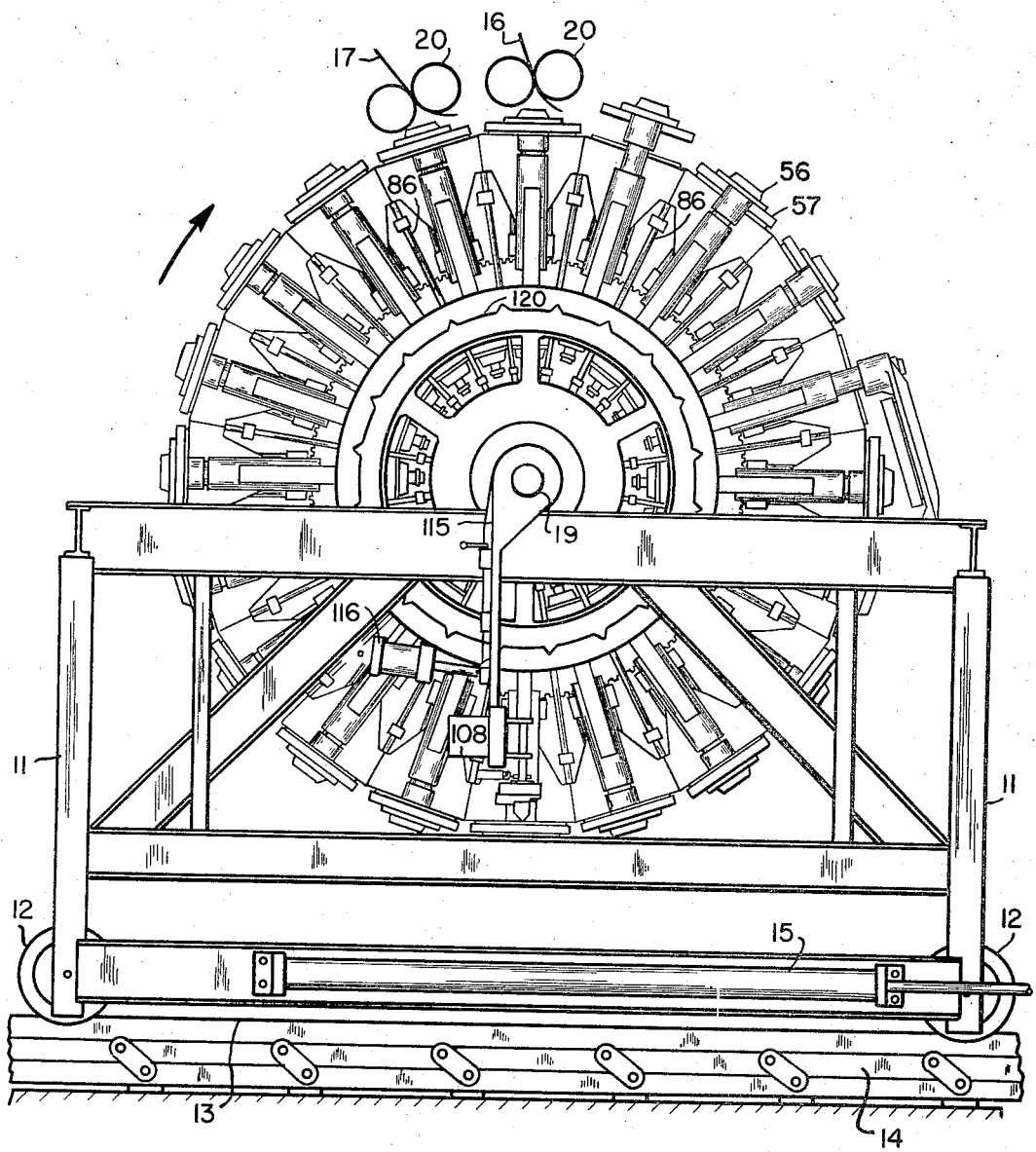
FIGURE 2 is a side elevational view of the same.

Referring now to the drawings, and particularly FIGURES 1 and 2, the forming apparatus is shown embodying a mold-carrying turret supported by a wheel carriage 11, whose wheels such as 12 rest on a section of track embodying rails 13 carried on an elevated platform 14. Two fluid cylinders such as 15, arranged on opposite sides of the carriage, are provided to facilitate its movement between opposite ends of the track, for varying the turret position with respect to molten glass ribbons 16 and 17, issuing from between rollers such as 20 from sources not shown, and laid upon or trained about the turret periphery.

The turret comprises a hub 18 rotatable on suitable bearings about a fixed shaft 19. One flange of the hub 18 carries a flange extension 22, and the other carries a ring drive gear 23 driven by a suitable pinion carried on the shaft of a turret drive motor 27. Attached to the outer regions of extension 22 and gear 23 are spokes, such as 24 and 25, in number corresponding to the number of molds to be arranged about the turret periphery.

Figure 5:
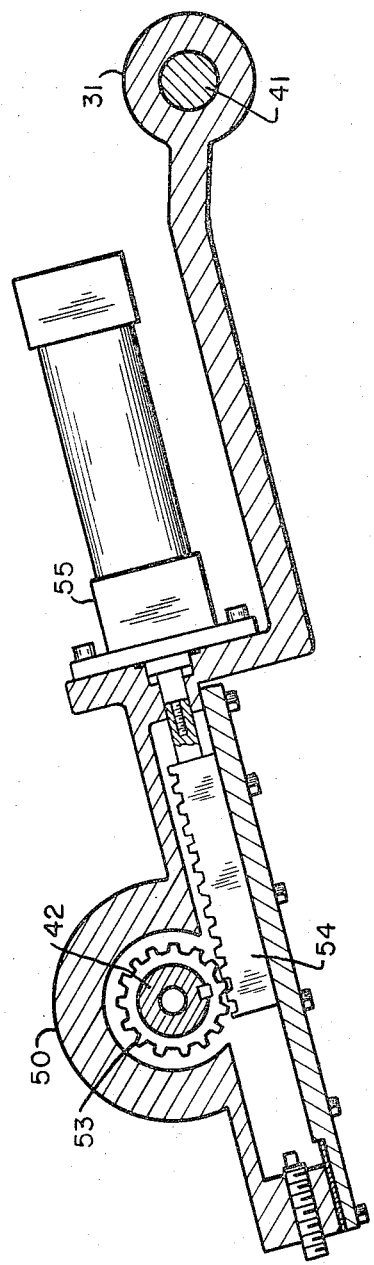
FIG. 5 is an enlarged view, partly in section and taken along line V—V of FIGURE 1, showing further details of the machine.
Figure 6:
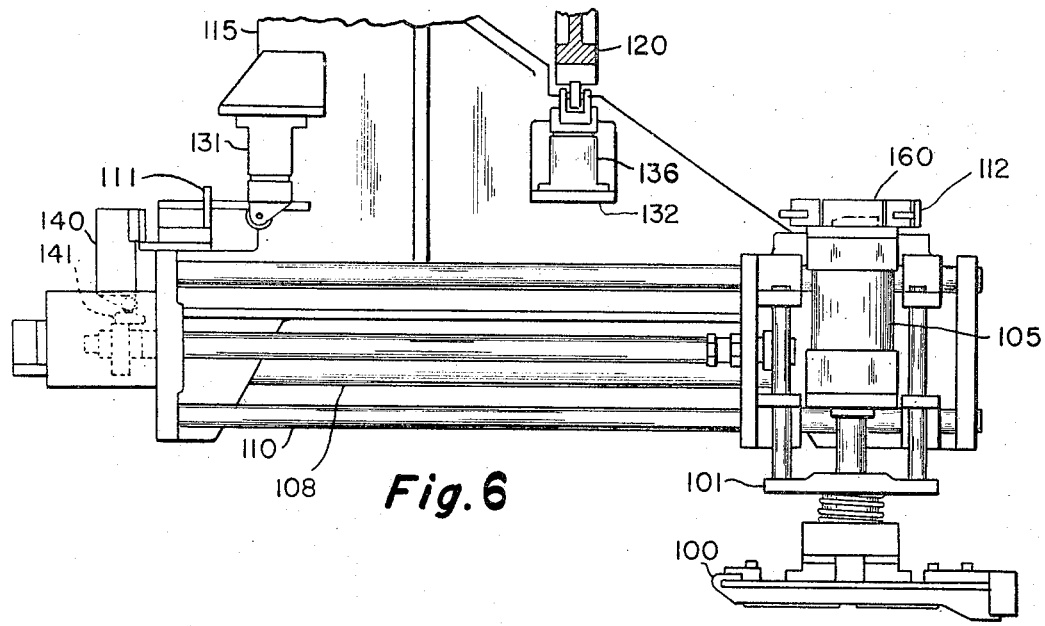
FIGURE 6 is an enlarged view of the take-out mechanism of the machine.

Supported by and arranged between, or bridging, each pair of spokes such as 24 and 25 is a yoke having a bridging member 31, within whose upper surface is formed a seat 30, for positionably retaining a lower mold section 32. The opposite lateral regions of the yoke have vertical passages therethrough occupied by columns 41 and 42 which are slidable therein. The columns 41 and 42 are bridged at their lower ends by a casing 50 which is centrally supported by a piston rod 51 of a fluid cylinder 52 rigidly attached to the underside of member 31. Column 41 is rigidly attached to casing 50, whereas column 42 is rotatably mounted with respect thereto. A pinion 53, keyed to column 42 within casing 50, (FIGURE 5) is in mesh with a rack 54 carried by the piston of a fluid cylinder 55. The upper end of column 42 has fixed thereto one end of an arm 56 (FIGURES 1, 3, and 12) carrying an upper mold section 57. The other end of arm 56 is provided with a C-shaped slot 62 for engagement with a collar 60 carried by the upper end of column 41. The rack and pinion linkage between fluid cylinder 55 and column 42 is such that arm 56 can be turned between a position bridging columns 41 and 42 to bring the upper mold section 57 into vertical or axial register with its lower mold section 32, and a position 180° therefrom to bring the upper mold section to a position laterally of the turret, as clearly illustrated particularly in FIGURE 1.

As is apparent in FIGURE 1, the rod 51 of fluid cylinder 52 is operable to move the upper mold section 57 axially down and up into and out of cooperative relation with its lower mold section 32 when axially arranged thereover.

For the purpose of illustration, the article vacuum formed by the machine is shown as a labyrinth lamp envelope 68 (FIGURE 10) As is apparent from FIGURES 3 and 4, lower mold section 32 has a cavity surrounding wall whose outer edge 34 is adapted to be brought into glass ribbon shearing relation with the inner wall edge 64 of the upper mold section 57, as they are brought into cooperative relation by the lowering of upper mold section 57 through operation of cylinder 52. Also, a pair of oppositely disposed choppers or shear members 65 and 66 are arranged on opposite lateral sides of the upper mold section 57, and a pair of choppers or shear members 35 and 36 are mounted on ribbon supporting surfaces 37 and 38 on the corresponding opposite sides of a lower mold section 32. As the upper mold section 57 is lowered into cooperative relationship with lower mold section 32 through the operation of cylinder 52, inner wall edge 64 is brought into shearing relation with cavity wall edge 34 to shear the article formed by the mold sections from the remaining glass ribbon, while shear members 65 and 66 are brought into engagement with members 35 and 36 to transversely shear such remaining cullet ribbon, which is retained on supporting surfaces 37 and 38.

In the labyrinth lamp envelope molds shown, the mold sections have complementary ribs such as 40 within their cavities that register with one another when the sections are in closed cooperative relation, to press and hermetically seal the two ribbons of glass to one another along such ribs. The ribs 40 cooperate to jointly form a cavity in an envelope 68, which has a generally tubular path extending back and forth thereacross, as is evident from the showing of such envelope. Also, the lower mold section 32 is provided with tubular passages 33 and 39, which form tubulations 67 and 69 at the opposite ends of the tubular path for future access to the interior of the envelope during labyrinth lamp manufacture and evacuation. The tubulation 67 is formed by vacuum supplied through a Venturi 49 (FIGURE 12) and which is effective to open the tubulation to atmosphere. The mold sections 32 and 57 both have suitable perforations, such as 43 (FIGURE 4), through their cavity bottoms for vacuum forming the sheets to the internal configurations of their associated mold sections. The perforations are in communication with vacuum chambers such as 44. The vacuum chambers are connected to vacuum sources such as the Venturies 45 and 48 (FIGURE 12). The passage 33 is also in communication with chamber 44 to effect formation of tubulation 69. Similarly, the ribbon surfaces 37 and 38 have chambers such as 46 in communication with a Venturi 47.

Fluid for operating the mold section of the turret, including cylinders 52 and 55 (FIGURES 1, 3, and 12), is supplied thereto and issued therefrom via fluid feed and return lines 76 and 77 connected to bores 78 and 79 respectively, in shaft 19. A valve 80 surrounds shaft 19, and is provided with passages in communication with bores 78 and 79, through which fluid is fed to and returned from cylinders 52 and 55 via lines 81, 82, 83, and 84, respectively, in the proper built-in time and relationship. Valves such as 85 in each of such lines are for fine adjustment of fluid flow control only.

Similarly, the supply of air to the respective Venturies 45, 47, 48, and 49 is via lines 90, 91, 92, and 93, which receive fluid through bores in hub 18, in the proper built-in time and relationship required from air supplied through the end of shaft 19 by a line 21.

As previously stated, a completed article is carried by a mold section 57, supported by arm 56, to a position laterally of the turret, by vacuum applied to such upper mold section through perforations 43 as it becomes dissociated from its lower mold section 32. A take-out apparatus is conveniently provided to remove an article from upper mold section 57, as the mold section approaches an inverted position.

The take-out apparatus (FIGURES 1, 6, 7, and 11) embodies a vacuum chuck 100 suspended from the piston rod of a cylinder 105, supported by a carriage 101, and horizontally slidable by a fluid unit 108 on rails 110. The chuck is slidably movable between a position in which the chuck faces an article supported on upper mold section 57, and a position laterally disposed from the turret, where the article can be released from the chuck 100.

An arm 115 (FIGURES 1, 2, and 6), supporting the chuck carriage 101 is pivoted about the turret axis. Further, the arm 115 is arranged to turn with the turret during the alignment of the chuck over an article to be removed, and during the period wherein the article is seized and withdrawn from the upper mold section. After lateral movement of the chuck, the seized article is moved clear of the mold, and is then released from the chuck. The arm 115 is then released from its movement with the turret, and permitted to return to its initial starting position under the influence of cylinder 116 (FIGURES 2 and 7). Cylinder 116 is continuously supplied with fluid from a suitable supply line (not shown) urging the arm 115 toward its starting position. Arm 115 is coupled to the turret for movement therewith through the medium of a latch embodying a fluid cylinder 118 (FIGURES 7 and 11). The cylinder 118 moves a latch bolt 119 into and out of the path of travel of a segment such as 117 of a timing ring 120, shown in FIGURE 1, which is supported on brackets 121 secured to flange extension 22.

The latch cylinder 118, as shown in FIGURE 11, receives its operating fluid from a feed line 133, extending from a distributing valve 130. The operation of valve 130, in one instance, is under the control of a pilot valve 131 (FIGURES 6 and 11), which in turn is operable by a cam 132 on the chuck carriage 101. Alternatively, valve 130 may be operated by fluid supplied through a line 144, extending from a pilot valve 170 (FIGURES 7 and 11), and which feeds fluid to valve 130 through a shuttle valve 74. Valve 170 is actuated by a cam 165 (FIGURES 7 and 11) carried by a guide rod of chuck cylinder 105, and is operated only as the chuck 100 is moved upward sufficiently to clear the ware from the mold section. Valve 170 then feeds fluid via line 144 and shuttle valve 74 to valve 130, which then in turn exhausts line 133 to the atmosphere to enable retraction of latch bolt 119, enabling the arm 115 to restore to its initial position.

The carriage operating cylinder 108 (FIGURES 1, 6, and 11) receives its operating fluid from a distributing valve 135, via lines 138 and 139. Valve 135 is operated, in one instance by fluid supplied from line 133 extending from valve 130, and in the other instance by fluid supplied from line 147, also extending from valve 130.

The chuck operating cylinder 105 (FIGURES 6 and 11) receives its operating fluid from lines 142 and 143 extending from a distributing valve 150. The valve 150 is operated, in one instance, by fluid from a line from pilot valve 136, via line 145 extending from a safety pilot valve 140, which is operable by a cam 141 carried by the piston rod of the carriage operating cylinder 108. In the other instance, valve 150 is operated by fluid from a line 146 extending from a shuttle valve 75.

During the operation of the take-out mechanism, a segment 117 of ring 120 engages and actuates the pilot valve 136, just prior to engagement of the segment with latch bolt 119 of cylinder 118. Upon actuation of valve 136, air is directed through the safety valve 140, which when operated supplies air to distributing valve 150. Valve 150, accordingly shifts its spool to a position to direct air to the chuck cylinder 105, which causes the chuck 109 to move to its outermost or extended position. Should a segment 117 on ring 120 inadvertently engage the latch bolt 119, as might happen in a start-up operation, before the carriage 101 has reached its innermost position, the take-out mechanism will turn with the latch ring 120 until stopped by a positive stop 200 (FIGURE 7) mounted on the frame 11. At this time the latch ring 120 will exert sufficient force on the latch bolt 119 to overcome the pressure in cylinder 118, thus allowing the bolt to slide over a segment 117 to allow the take-out mechanism to return to its initial position under the influence of cylinder 116.

The starting and stopping operations of the take-out mechanism are under the control of a valve 70 (FIGURE 11), whose spool is manually operable by a lever 71. When the spool of valve 70 is shifted to its stop position, a pilot valve air supply line 73 having branches to pilot valves 131 and 136, is connected to the atmosphere, and air is alternatively directed through shuttle valves 74 and 75, respectively. The shuttle valves 74 and 75 thereby feed air to shift the spools of valves 130 and 150. Valve 150 reverses the fluid and exhaust connections to chuck cylinder 105 to effect the movement of the chuck 100 to its inward positions.

Valve 130 exhausts the air supply line 133 to latch cylinder 118 permitting the latch bolt to withdraw from engagement with a segment 117, and also directs pilot air via line 147 to the valve 135, which operates to reverse the air supply and exhaust connections to the carriage actuating cylinder 108, so that the carriage is moved to its outward position. A vacuum control valve 160, mounted on carriage 101, is operated by a cam 111 (FIGURE 6) which is mounted on the outer end of the carriage support, to turn off the air supply to Venturi 157, as the carriage reaches its outward position, to thus release the article from the upper mold section.

In the normal operation, the carriage 101 arrives at its innermost position and safety valve 140 is operated by cam 141, carried by the piston rod of the carriage operating cylinder 108, prior to the operation of pilot valve 136 by segment 117. Immediately following operation of pilot valve 136 by segment 117, such segment engages latch bolt 119 to keep chuck 100 in axial alignment with the article in its upper mold section 57. When the pilot valve 136 is operated by segment 117, fluid is directed via safety valve 140 and line 145 to shift the spool of distributing valve 150 to a position in which it feeds fluid to the upper end of chuck cylinder 105. Chuck 100 is thus moved downward to engage the article supported by the upper section of the mold immediately under it. A cam 155, mounted on the piston rod of chuck cylinder 105, at this time actuates a pilot valve 156, which in turn directs air via shuttle valve 75 and line 146 to the valve 150. Valve 150 accordingly admits air to a Venturi 157, via line 143 and through vacuum control valve 160, which is operated by a cam 112 (FIGURE 6) on the inner end of the carriage support, to create a vacuum within the chuck 100 for seizure of the article engaged by it. Valve 150 also operates to effect reverse fluid connections to the chuck cylinder 105, so as to retract the chuck 100 and article removed thereby.

As an article is withdrawn clear of its mold, the cam 165 actuates pilot valve 170 to operate valve 130 to, as previously explained, exhaust air from cylinder 118 and thus permit its spring to retract the latch bolt 119 from the segment 117 of timing ring 120, and to shift the spool of valve 135 so that it supplies fluid to cylinder 108 to move the carriage 105 to its outward position. When the cylinder 108 is fully extended, valve 160 is operated by a cam 111 to turn off the vacuum, and pilot valve 131 is actuated by cam 132 on the carriage 101 to operate valve 130. Valve 130 in turn feeds fluid to cylinder 118 to again project the latch bolt 119 into the segment path of ring 120, and operates valve 135 to retract the rod of the carriage actuating cylinder 108 to complete the cycle.

As will be observed from FIGURES 2 and 8, there are a plurality of rods such as 86 and 87 radiating outwardly from the central area of the turret. The rods of each pair, at their outer ends, are bridged by a bar 88 carrying a plurality of fingers such as 107 (FIGURES 4 and 9), projected into passages through the line of juncture of adjacent lower mold sections 32. These rods, at their inner ends, are anchored to cranks 97, carried on transverse shafts 98, bridging flange extension 22 and the gear 23. Cranks 99 are mounted on end portions of shafts 98 which project through gear 23. Each crank 99 is provided with a roller 94 on its free end. A cam 102, fixed on carriage 11, is engageable by rollers 94 to thrust a pair of the rods radially outward as such mold arrives in an inverted position, to force the fingers 107 through the passages and thus disengage the ribbon cullet from half of the opposing surfaces 37 and 38 of two adjoining lower mold sections, in the fashion also taught in French Patent No. 1,341,104.

I claim:

1. Apparatus for forming hollow articles from thermoplastic sheet material which comprises, a turret rotatable about a central axis, a plurality of molds positioned about the periphery of said turret, each said mold having a pair of laterally separable mold sections provided with contoured cavities which complement one another when said mold sections are in axial alignment, means for providing a first sheet of thermoplastic material over a lower mold section while a complementary upper mold section is laterally displaced, means for vacuum forming said first sheet of thermoplastic material to conform to the contoured cavity of said lower mold section, means for providing a second sheet of thermoplastic material over said first sheet of thermoplastic material, means for moving relationship with said lower mold section, means for pressing said upper mold section into cooperative axially aligned sealing portions of said first and second sheets of thermoplastic material together, means for vacuum forming said second sheet of thermoplastic material to conform to the contoured cavity of said upper mold section, and means for removing the thus formed hollow article from said mold.

2. Apparatus as defined in claim 1 including cooperative means on said upper and lower mold sections for shearing the article formed by said mold cavity from the remainder of said thermoplastic sheets and for simultaneously shearing such thermoplastic sheet material transversely of the mold cavity.

3. Apparatus as defined in claim 1 wherein vacuum means initially retains the newly formed article within said upper mold section, and vacuum chuck means pivotally mounted about the axis of said turret for movement in unison with said turret through a predetermined arc is provided for removing the newly formed article from said upper mold section.

4. In a glass-working machine, a turret rotatable about a horizontal axis, a plurality of two-section molds positioned about the periphery of said turret, one section of said plurality of molds being arranged in a first circular row about said turret and a second section of said molds being arranged in a second circular row, a complementary cavity formed in each mold section, means for supporting said second section of each mold alongside its complementary mold section, means for training a sheet of molten glass over said one mold section, means for vacuum forming the sheet within the cavity of said one mold section, means for training a second sheet of molten glass over said first sheet, means for moving said second mold section into operative axial alignment with said first mold section, and means for vacuum forming said second sheet of molten glass within the cavity of said second mold section while the complementary sections are in cooperative relation to thereby form a unitary hollow glass article.

5. In a glass-forming machine, a turret continuously rotatable about a horizontal axis, a plurality of molds carried by said turret, each mold comprising two complementary parts, one mold part having a mold cavity facing radially outwardly from the periphery of said turret, the other mold part having a mold cavity facing inwardly toward the axis of said turret, means mounting said other mold part for movement between a position laterally of said one mold part and a position aligned axially thereover, means for moving said other mold part between such positions, means for relatively moving said axially aligned mold parts radially of said horizontal axis into a closed cooperative position with respect to each other, and means responsive to the rotation of said turret about said horizontal axis for actuating said movements in a desired sequence during the rotation of said turret.

6. A glass-forming machine as defined in claim 5 including means for sequentially training two continuous sheets of molten glass over said outwardly facing mold parts, means for deforming one of said sheets to the cavity configuration of said one mold part while said molds are in an open position, and means for deforming the other of said sheets to the interior configuration of said other mold parts when said molds are in a closed position.

7. Apparatus for forming hollow glass articles from two overlapping glass sheets which comprises, a turret rotatable about a central axis, a plurality of lower mold sections arranged in a circular row about the periphery of said turret, complementary upper mold sections supported by said turret for movement between a position laterally of said lower mold sections and a position in axial alignment therewith, means for moivng said upper mold sections into and out of cooperative relationship with said lower mold sections, complementary mold cavities formed in said upper and lower mold sections, means for separately forming a pair of overlapping glass sheets in said complementary mold cavities to form a unitary hollow article, and means for removing formed articles from said mold sections as they rotate in unison with said turret.

References Cited
UNITED STATES PATENTS

| | | | |
|---|---|---|---|
| 1,984,942 | 12/1934 | Owen | 65—145 |
| 2,333,076 | 10/1943 | Stewart | 65—67 |
| 2,349,739 | 5/1944 | Louden et al. | 65—152 |
| 2,680,332 | 6/1954 | Young | 65—58 XR |
| 3,114,620 | 12/1963 | Giffen | 65—156 XR |
| 2,231,356 | 1/1966 | Giffen | 65—184 |

DONALL H. SYLVESTER, *Primary Examiner.*

F. W. MIGA, *Assistant Examiner.*

UNITED STATES PATENT OFFICE
CERTIFICATE OF CORRECTION

Patent No. 3,347,652    October 17, 1967

James W. Giffen

It is hereby certified that error appears in the above numbered patent requiring correction and that the said Letters Patent should read as corrected below.

Column 6, line 37, strike out "relationship with said lower mold section, means for press-", and insert the same after "aligned" in line 38, same column 6; column 8, line 6, for "moivng" read -- moving --.

Signed and sealed this 12th day of November 1968.

(SEAL)
Attest:

Edward M. Fletcher, Jr.
Attesting Officer

EDWARD J. BRENNER
Commissioner of Patents